United States Patent
Monday et al.

(10) Patent No.: US 6,434,740 B1
(45) Date of Patent: Aug. 13, 2002

(54) APPARATUS AND METHOD FOR VISUAL CONSTRUCTION SIMPLIFICATION

(75) Inventors: Paul Brian Monday; Bradley Scott Rubin, both of Rochester, MN (US); Galina Gavrilo, Riga (LV); Nikolajs Krasnikovs, Riga (LV); Zahara Sulkins, Riga (LV)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/115,848

(22) Filed: Jul. 15, 1998

(51) Int. Cl.[7] .................................................. G06F 9/44
(52) U.S. Cl. ..................................... 717/108; 717/136
(58) Field of Search ........................... 717/1, 108, 136, 717/2

(56) References Cited

U.S. PATENT DOCUMENTS

| | | | |
|---|---|---|---|
| 5,845,119 A * | 12/1998 | Kozuka et al. ................. | 717/2 |
| 5,872,973 A * | 2/1999 | Mitchell et al. ............ | 709/305 |
| 6,185,730 B1 * | 2/2001 | LeBlanc .......................... | 717/1 |
| 6,209,125 B1 * | 3/2001 | Hamilton et al. ............... | 717/4 |
| 6,237,135 B1 * | 5/2001 | Timbol ........................... | 717/1 |

OTHER PUBLICATIONS

Template Software Inc., SNAP Foundation Template, Using the SNAP Development Environment (Using SNAP), Chapters 1–4, Jun. 1997.*

"Template Software Rolls Out Corporate and Product Growth Strategies at Solutions '97 Conference", PR Newswire, Apr. 3, 1997.*

"Template Software Strengthens Core Product Family With Ease–of–Use and Functional Enhancements that Promote Unparalled Software Reuse", PR Newswire Associates, Jun. 23, 1997.*

"Object–Oriented Modeling and Design", J. Rumbaugh et al., pp. 36–41,60–63, Nov. 14, 1990.*

"Object–Oriented Compiler–Construction", Jim Holmes Chapters 1–2 and 8, 1995.*

\* cited by examiner

*Primary Examiner*—Gregory Morse
*Assistant Examiner*—Todd Ingberg
(74) *Attorney, Agent, or Firm*—Schmeiser, Olsen & Watts; S. Jared Pitts

(57) ABSTRACT

A method and apparatus for connecting two components is disclosed. A visual construction simplification mechanism, as part of the apparatus, is designed with intelligence that allows it to correctly configure and interconnect the two components. The invention reduces the real and visual complexity of a program by requiring only a single bootstrap connection to be established between the components. Once the initial connection is made, the visual construction simplification mechanism can make additional connections that allow the two objects two function and interoperate. Introspection is a process used to find a component's interface and identity. The visuals construction simplification mechanism looks at the interface of one component and figures out what the identity of the component is using the process of introspection. Introspection is a generic term for the ability of any component to look at the details of another component. Using the information gained through introspection, the visual construction simplification mechanism connects the correct methods and events to properly interconnect the two components.

52 Claims, 5 Drawing Sheets

APPARATUS AND METHOD FOR VISUAL CONSTRUCTION SIMPLIFICATION

BACKGROUND OF THE INVENTION

1. Technical Field

This invention generally relates to object-oriented programming. More specifically, this invention relates to reducing the complexity of object interfaces.

2. Background Art

The development of the EDVAC computer system of 1948 is often cited as the beginning of the computer era. Since that time, computer systems have evolved into extremely sophisticated devices, and computer systems may be found in many different settings. Modern computer systems vary in their design and architecture, with many different models available to achieve the desired combination of speed, power and efficiency for any given computing environment.

Computer systems typically include operating system software that controls the basic functions of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Object-oriented programming, based on an object model, is a new way of creating computer programs that has become very popular over the past several years. The goal of using object-oriented programming is to create small, reusable sections of program code known as objects that can be quickly and easily combined and re-used to create new programs. By creating and re-using a group of well-tested objects, a more stable, uniform, and consistent approach to developing new computer programs can be achieved.

Objects help program designers create better software faster because objects are reusable, have defined interfaces, and are already tested. In addition, some of an object's interface (where other objects are allowed access to some of the internals of the particular object) and much of the internal workings of the object can be changed without changing the objects that use the particular object. In other words, if Object A uses Object B to perform a certain function, the way that Object B actually performs that function can be changed without any changes to Object A or without changes to Object B's interface. Because the inner workings of objects are "hidden," objects can be changed to a great degree without causing changes to outside objects. Another benefit of having the inner workings hidden is that the program designer does not need an understanding of how the object works; instead, the program designer only needs to know what the object does. In this way, the program designer can merely use the object without spending an inordinate amount of time either programming another function to perform the object's function or examining the object to see how it works.

Because of the tremendous improvement in programming simplicity and reuse provided by objects, object-oriented programming has become extremely popular. Many software companies have attempted to make objects even easier to use. For instance, to help program designers who are designing object-oriented programs, computer software manufacturers have designed certain tools to make object-oriented programming easier. One such tool is a visual compiler that shows program designers how the various objects are connected and what their interfaces are. Using these tools, program designers can simply "drag and drop" pre-made objects from a "palette" onto a "canvas" and then connect the objects together. The visual nature of these development tools makes it relatively easy, at least for small programs, to see how the program is designed.

In addition to visual tools, software companies have begun to "package" objects. This packaging of objects can take several forms. One such form, allowed by most visual compilers, is embodied in the idea of components. Components are pre-built objects that perform various functions. The programmer who actually programs the component is called the "component creator," "component builder," "component architect," or "developer." Both the computer scientist who programs the component and the programmer who uses the component are actually "developers"; however, to clearly demarcate who is actually creating the component, only the component builder will be called a "developer." The programmer actually using the component is called the "assembler" or "program designer." Assemblers or program designers choose the pre-designed component that meets their needs, and drop or add the component from the palette to the canvas. Assemblers can also modify the component, if necessary, to perform the assembler's desired function. In addition, assemblers can make their own components that they can then reuse at a later time. Assemblers can combine their own components or other pre-made components into a program by placing each component onto the canvas and connecting all components together.

The second form of the packaging of objects is simply using pre-made components from a software vendor. The software vendor, as the component builder, creates generic components that are applicable to many tasks and then licenses these components to software program designers. Both parties benefit from this arrangement because the assemblers get a well-defined, tested infrastructure upon which to base their applications, and the software vendors receive an influx of money from licensing fees.

Even though visual development systems and components are tremendously useful development tools in simple environments, they suffer from connectivity problems when employed in more complex situations. When an assembler adds an object or component from the assembler's palette onto the assembler's canvas, the assembler must then connect this new object to the old objects that will be interfacing with (or to) the new object. Connections are made to provide paths for data flow between components. The paths for data flow are generally method calls, wherein one component is calling another component's method and sending and/or receiving data at the same time. The connection symbol between objects is visually represented by a line. The connectivity problem in complex environments occurs for at least two reasons. First, the number of lines on the canvas quickly becomes so large as to partially or completely obscure the objects and components. Second, the complexity of even small designs becomes quickly overwhelming with each added component. This occurs because each component may have many connections to multiple components. Even with a relatively small number of components on a canvas, the number of interconnections between the components will be so large that the structure of the program becomes lost in the extreme number of interconnections. The program designer can no longer ascertain what the structure of the program is. The benefit of having a visual design tool that quickly shows the structure of the project is lost in the morass of connection symbols.

For instance, if the assembler is designing a car, the car component will be connected to many other components (or sub-components) such as an engine, doors, a suspension system, a stereo system, etc. Furthermore, many of the sub-components will have sub-sub-components, e.g.—the engine might have a cylinder component to indicate the number, size, and other features and functions of the cylinders. Each of the sub-sub-components will be connected to the appropriate sub-component that, in turn, will be connected to the car component. Finally, many or all of the sub-components and sub-sub-components will have some property that can be modified by the assembler or user of the system being designed. The assembler or user changes these properties through some type of user interface (UI). The UI will generally be performed by a UI component that has been specifically adapted to the particular data that needs to be entered. As an example, if the user wishes to change the number of cylinders from 4 to 10, the end program will have some type of UI element, such as a box in which the user can type the number of cylinders. Alternatively, the UI may provide some type of drop-down menu from which the user can select the number of cylinders. Connecting all of these various user interface components to the other components creates a tremendous quantity of lines that tend to obscure the actual components and that tend to create a very complex software structure.

Without a simpler method for connecting and displaying the connections between objects and components, developers and designers will continue to be unnecessarily limited in the development and implementation of object-oriented systems.

DISCLOSURE OF INVENTION

The preferred embodiments of the present invention provide a method and apparatus for allowing an assembler (using a visual palette and canvas) to connect two components together through a single point on each component's interface. A visual construction simplification mechanism, as part of the apparatus, will then correctly perform all other connections that are needed to properly connect components that are currently or will be part of the program. The visual construction simplification mechanism will only connect those other components that are necessary for proper operation of the entire program, and all other secondary connections are hidden.

The visual construction simplification mechanism performs a process known as "introspection" to find to what type of component a first component is connected. Introspection is a generic term for the ability of a component to examine or inspect the details of another component. Introspection is a discovery process in which a component using the visual construction simplification mechanism "looks back" to the component to which it is connected. The visual construction simplification mechanism looks at the interface of the component to which its component is connected and figures out what this second component is. From this introspection process, the visual construction simplification mechanism sets up the correct methods calls and event routing to interoperate with the component to which its component is connected.

The visual construction simplification mechanism can set up the first component correctly because the first component's developer builds in the necessary logic for the component to enable the first component to interconnect with the second component in such a manner. The assembler, thus, does not have to worry about connecting the two components or designing functionality into the first component.

The foregoing and other features and advantages of the present invention will be apparent embodiment of the invention, as illustrated in the accompanying drawings.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

Figure 1:
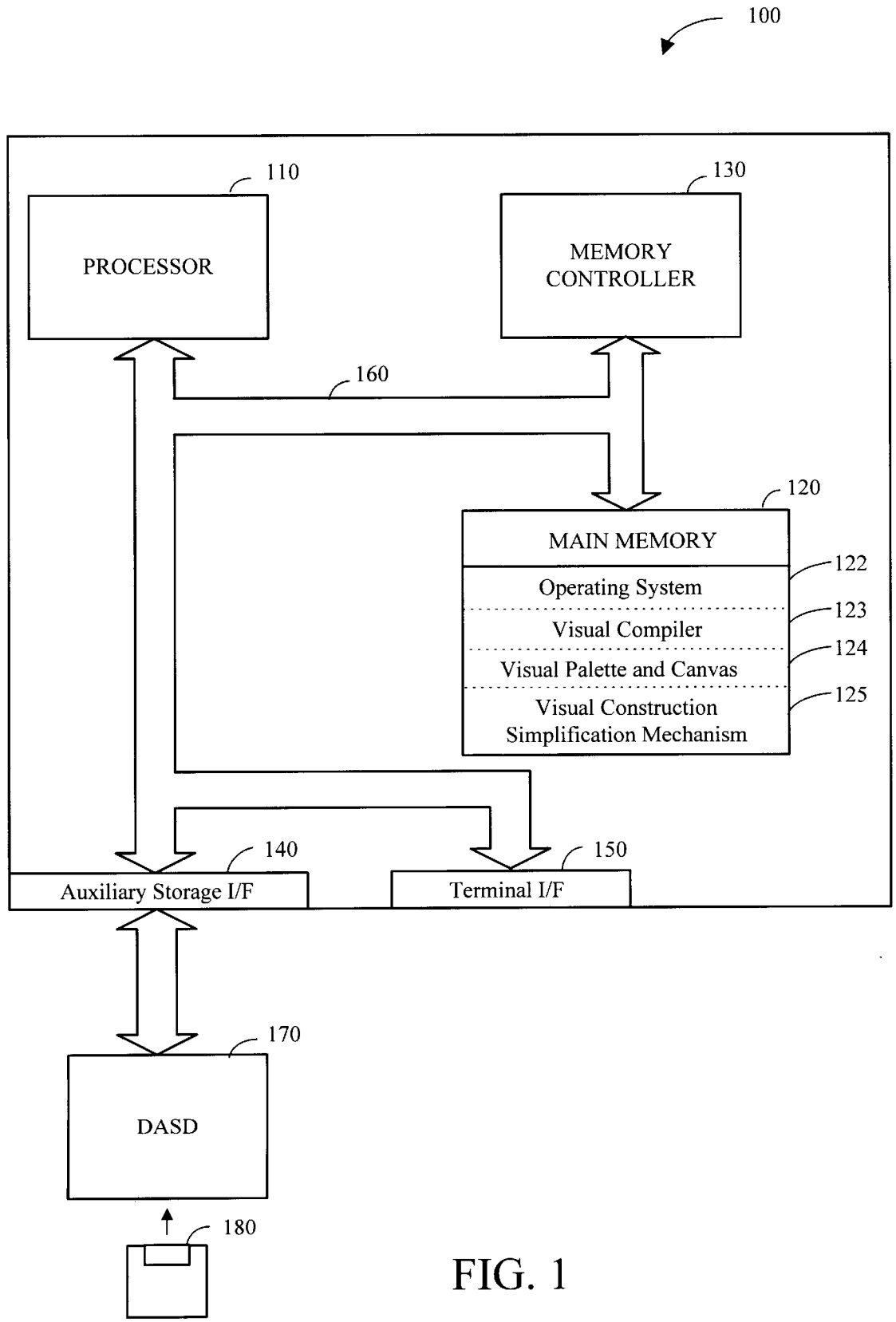
FIG. 1 is a computer system in accordance with the preferred embodiment of the invention.

The present invention relates to components and object-oriented programming. For those individuals who are not generally familiar with components, the Overview section below presents many of the basic concepts and terminology that will help to understand the invention. Individuals skilled in the art of components and object-oriented programming may wish to skip this overview and proceed directly to the Detailed Description section of this specification.

1. Overview

The components presented here build on object-oriented programming, and therefore object-oriented programming will be discussed first. It should be noted that components do not require that object-oriented programming techniques be used for their creation. Object-oriented programming is a method of program implementation in which programs are organized as cooperative collections of objects, each of which represents an instance of some class, and whose classes are all members of a hierarchy of classes united via inheritance relationships.

An important concept for object-oriented programming is that classes are "blueprints" for objects, and objects are "instantiations" of classes. If a class is a "house," for example, a programmer can create two houses from this class. These two houses, House A and House B, will have all the same types of data and methods that are contained in the class blueprint. They will both have, as examples, kitchens, floors, ceilings, bathrooms, and garages. But because House A and House B are different objects, the number and type of kitchens, floors, ceilings, bathrooms, and garages for each house can be different. In addition, both houses can be destroyed, and a program can still create or instantiate yet another house because the class—the blueprint of the house object—still exists. Even though there is this difference between classes and objects (an object is a real entity, while a class is a blueprint), the terms classes and objects will be used interchangeably because an object cannot exist without a class.

A pure object-oriented program is made up of code entities called objects. Each object is an identifiable, encapsulated piece of code and data that provides one or more services when requested by another object. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

Another important concept for object-oriented programming is the concept of method calls. A method is a portion of the program that performs a particular function. For pure object-oriented programming, methods are not separate from a class or an object instantiated from the class. For instance, if HouseA is an object instantiated from the house class and HouseA has a method called "getHousePrice", then one would call the method with the statement "HouseA.getHousePrice". Thus, methods are "contained" in classes and objects. The "HouseA." part of the method call is important because it tells the compiler that the user wants the getHousePrice( ) method of HouseA only. If there is also a HouseB, the compiler needs to create the executable program or byte code (for the Java programming language) such that the program or byte code will call the correct method at runtime. This is normally done by passing a reference (or pointer) to the getHousePrice( ) method. The reference (called a "this" pointer or reference), then, clearly demarcates which. object's (HouseA's or HouseB's) house price will be operated on by the getHousePrice method, The latter discussion concerns the normal way of providing support for a method call when the method call is known when the program is compiled. Those skilled in the art will realize that if the method call is not known at compile time, then many programming languages support dynamic or late binding. Dynamic binding allows a programmer to delay telling the program which method is going to be called until sometime while the program is running. For instance, the programmer may have an array or structure of methods, anyone of which may be called at any time during execution of the program. When one of the methods from the array is actually called during execution of the program, this is called dynamic binding because the method is not bound until the program executes. The compiler must build the functionality for dynamic binding into the executable program or byte code so that particular methods may be called at runtime. The binding for the method cannot be completed at compile time because any one of the methods in the array may be called at any time.

Turning now to components, components build on object-oriented programming because components generally contain objects. At the visual compiler level, a component can be as simple as one particular class of objects. An assembler generally creates many classes of objects during the creation of one program. Some of these classes are general enough to be used in other programs. An assembler, wishing to reuse these general classes over again in other projects, can create a component from the class and place the component in a component library for later recall and reuse in a different project.

Some of the more common features of components are component properties, component methods (or functions), event notification mechanisms, and intercommunication. Properties define the behavior of components. Properties can be numbers, arrays, objects, and other components. Properties from different components can also be interrelated. For instance, in our car example, if the number of the engine's pistons increases, the property of the engine component that indicates the displacement of the engine should change; this change should cause the car component to update the engine component with the new information. Component methods or functions are similar to, or the same as, object functions. Finally, components can intercommunicate with one another. Intercommunication (or "event notification") is generally performed after an "event" has happened. In the example where the number of pistons were increased, this increase is an event that must be routed from the car component to the engine component. In other words, the engine component must be notified that the event has happened and some method or routine must "handle" the event. There are many ways in which events may be routed and handled. In particular, the java.util package of the JAVA language allows listeners, implementing the EventListener interface, to receive and handle events. To receive and handle events, the listener registers itself, by using particular registration methods, with an event source. The event source is the component that causes the event. In the previous example, the component (the event source) that knows that the number of pistons has increased will route the piston change by contacting the registered listener for this piston change, and the registered listener will then react to the piston change by updating the engine component.

The last important feature of components is introspection. Introspection is a process whereby one component can examine another component's interface. In this way, the properties, methods and events of a component may be ascertained. In fact, a component builder has quite a bit of control over the introspection information that will be given to another component when that component introspects the component builder's component. By being more specific with the information that is passed to other components during introspection, the component builder can assure herself that her component will be correctly identified.

Although components can be as simple as a single class of objects and have simple features, components can also be considerably more complex. Several classes and their associated resources and features can be placed in a component. Components from software vendors are becoming more complex, as vendors begin to understand "wiring" or connection complexities, and these complex components may contain many classes, a variety of tools, and many features. For instance, IBM's San Francisco project offers assemblers a group of components called the "Business Process Components." These components are designed as frameworks that provide an object-oriented infrastructure, a consistent application programming model, and some default business logic that can be used to start building applications. The San Francisco project has three layers of reusable code for use by assemblers. The highest layer, called the Core Business Processes, provides business objects and default business logic for selected vertical domains, or markets. The second layer, called the Common Business Objects, provides definitions of commonly used business objects that can be used as the foundation for interoperability between applications. The lowest layer, called the Base, provides the infrastructure and services that are required to build industrial strength applications in a distributed, managed object, multi-platform application. The Base isolates an application from the complexities of multi-platform network technology, and frees the assembler to focus on unique elements that drive value to their customers.

To conclude, object-oriented technology can be used in conjunction with components. Components can be as simple as classes of objects, but are becoming more complex and more sophisticated all the time. Components from software vendors can be very complex and offer many features.

2. Detailed Description

The problem needing to be solved, as illustrated by the example in the Background Art section, is that the assembler has a great collection of components that need to be interconnected with different (or the same) types of components and the components' sub-components. Interconnecting all of these components on a visual canvas makes the diagram on the canvas—and the program of which the diagram is a representation—become extremely complex, possibly to the point of being intractable. The assembler no longer has a good understanding of how the program is constructed, and many assemblers actually forego the use of visual programming tools, returning instead to non-visual programming tools.

The preferred embodiment of the visual construction simplification from N to 1 connection invention solves this problem by allowing the user make only a single connection between two components. Once this connection (called a "bootstrap" or "existing" connection) is made, a visual construction simplification mechanism contained in a component will perform introspection on the connected component. After the introspection process has been completed, the visual construction simplification mechanism will know the properties, methods, and events of the other component. In short, the visual construction simplification mechanism knows what the other component "is." Using this information, the visual construction simplification mechanism can perform all other needed connections to connect the two components together.

The onus, then, is on the component developer to ensure that each component can interface properly with other components. The assembler does not have to figure out how to connect all the various components and sub-components (except, of course, for the bootstrap connection). The visual canvas is dramatically less complex because many of the interconnections between components and sub-components are hidden.

Referring now to FIG. 1, a computer system 100 in accordance with a preferred embodiment of the present invention is a computer system running a visual programming design tool having a visual palette and canvas. However, those skilled in the art will appreciate that the methods and apparatus of the present invention apply equally to any computer system, regardless of whether the computer system is a complicated multi-user computing apparatus, or a single user device such as a personal computer or workstation, or any such system running a non-visual compiler. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to illustrate some of the salient features of computer system 100.

Processor 110 performs computation and control functions of computer system 100, and may comprise at least one suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes an operating system 122 within main memory 120. Operating system 122 can be any operating system able to run a compiler, such as Unix, Linux, OS/2, WINDOWS NT, WINDOWS 95 or 98, etc. Operating system 122 controls the basic functions of computer system 100.

Preferably running with and being controlled by operating system 122 are the elements of a programming environment comprising a visual compiler 123, a visual palette and canvas 124, and a visual construction simplification mechanism 125. Visual compiler 123 can interact with a separate visual palette and canvas 124, as shown in FIG. 1, or visual compiler 123 and visual palette and canvas 124 can be contained in a single program that has the functionality of both. In addition, visual construction simplification mechanism 125 can also be used with non-visual programming tools and compilers, because the benefit of visual construction simplification mechanism 125 is really the decrease in connection complexity of the overall program. Thus, visual construction simplification mechanism 125 provides a benefit to any assembler building any program, but the optimal results are achieved through the use of a visual programming tool such as visual palette and canvas 124 running in a programming environment as described.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD-ROMs, and transmission type media such as digital and analog communication links, including wireless communication links.

Memory controller 130 is responsible for providing control signals to move, store, and retrieve requested data from main memory 120 and/or through auxiliary storage interface 140 to processor 10. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Figure 2:
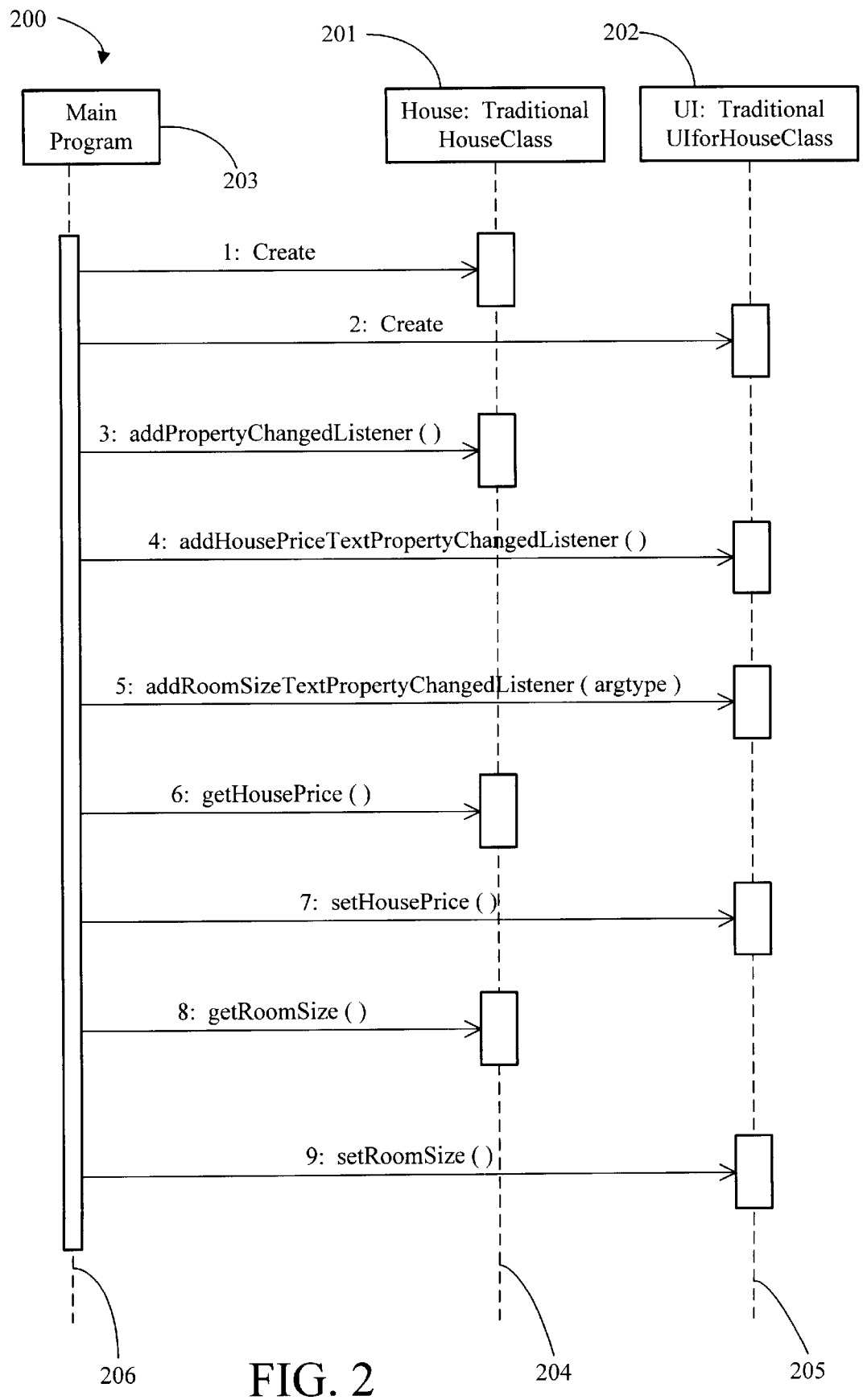
FIG. 2 is a class sequence diagram illustrating the interconnection of and the process of interconnecting traditional classes.

Turning now to FIG. 2, a traditional class sequence diagram 200 illustrating the interconnection of and the process of interconnecting traditional classes is shown. Traditional class sequence diagram 200 connects TraditionalHouseClass 201 to the user interface class for this class, TraditionalUIforHouseClass 202. Traditional class sequence diagram 200 shows both the sequence in which methods are called and how these methods are connected. A component assembler connects these classes to each other and main program 203 by connecting lines between main program 203 and TraditionalHouseClass 201 and TraditionalUIforHouseClass 202. These lines represent method interconnections between the main program and the various methods contained in each class. Thus, FIG. 2 illustrates both an assembly process, wherein the assembler connects the various classes through method calls, and an interconnection diagram, wherein any assembler can see what calls are being made. Extension lines 204, 205, and 206 indicate that the TraditionalHouseClass 201, TraditionalUIforHouseClass 202, and main program 203, respectively, continue down the page, but that only a portion of the possible interconnections have been shown. Extension lines 204, 205, and 206 also indicate which class has or contains the particular method. For instance, the sixth method shown, the god of TraditionalHouseClass 201, and main program 203 calls the getHousePrice( ) method on the object instantiated from TraditionalHouseClass 201.

Traditional house sequence diagram 200, as stated above, shows a house class, TraditionalHouseClass 201, and its associated user interface. This house class (and an object instantiated from this class) has certain properties associated with houses. These properties are those properties that one would naturally associate with a house, such as number of rooms, the size of the house, the house's price, the number of bathrooms, etc. In FIG. 2, only the price and room sizes are configurable through the user interface. The user interface class, TraditionalUIforHouseClass 202, preferably provides the necessary graphical user interface (GUI) tools necessary to allow a user of the program to modify the particular values associated with the house. For instance, based on FIG. 2, the rooms' sizes and the house's price may be modified by the user, preferably by having the user enter this information into a text box.

In order for main program 203, the TraditionalHouseClass 201 and TraditionalUIforHouseClass 202 to provide a house having changeable properties, the proper interconnections between all three components must be made. These interconnections are generally method interconnections, each method connection indicating how the methods are connected. FIG. 2 shows nine different method interconnections, numbered 1 through 9. The first method, Create( ), connects main program 203 with the Create( ) method of TraditionalHouseClass 201. There is also a Create( ) method for traditional TraditionalUIforHouseClass 202. These create methods are constructors. Constructors are object-oriented methods that set data members for an object equal to particular values and perform other necessary functions in order to properly create and instantiate objects.

The other methods add functionality to "get" and "set" the various properties associated with TraditionalHouseClass 201. In order to change a property, the user would like to enter the data somehow. The preferable manner of entering data is through a GUI, whereby the user adds data to a text box or selects a value from a drop-down menu. Even though a GUI interface. is the preferred manner of having a user enter data, any method or technique now known or later developed where data may be entered into a program is applicable, e.g. using batch files, communicating with data bases, directly entering barcode scanner data, etc.

When using a GUI to enter data, the main program will generally be notified when a change has taken place. For instance, if the user enters a new house price into a text box, main program 203 will generally be sent a message that the house's value has changed. Because GUI-based programs communicate with their user interfaces through messages, listener objects are used to listen for changes in properties.

Changes in properties, as partially discussed in the Overview section, are termed "change events" or "events." Users or objects or both can initiate change events. Users change properties through manipulating data on the user interface, such as typing in "10" for the number of rooms. Objects themselves can also change properties by performing the correct method call. For instance, when the user changes the number of rooms to "10," the house's size may need to be changed. A listener object could then call the appropriate method or methods to actually change the house's size.

Listener objects may also receive notification that the property's user interface value has changed, or main program 203 or another program may receive and transmit this notification to the listener object. The preferred embodiment of the invention is to have the listener register with the event source, and the event source will then contact the listener. However, any method for event notification and routing of events known to those skilled in the art could be used. Once the listener object finds out that the user has changed a property, the listener object then will generally call all the needed methods to ensure that the property associated with the object is properly changed. Generally, the listener object will call the particular SetProperty method associated with the property because the listener object will be passed the new value of the property.

Note also that the interaction between a UI and its associated object is a two-way street. If a value associated with the UI is changed, the associated object must be notified. If the associated object changes one of its properties, that property must be changed in the UI and the UI must be notified. Thus, the UI and its associated object can both be listeners. As noted above, when the associated object is a listener and is passed a value, the SetProperty method associated with the particular value is usually called. When the UI is a listener, a method on the UI will be called that corresponds to the particular property that has been changed. An example of this two-way interaction follows in the upcoming paragraphs.

FIG. 2 illustrates listeners and UI objects for several different properties. The third method, addPropertyChangedListener( ), connects main program 203 to TraditionalHouseClass 201. This method registers the instance of TraditionalUIforHouseClass 202 as a listener for events that occur in the instance of TraditionalHouseClass 201. After addPropertyChangedListener( ) has been called, TraditionalUIforHouseClass 202 will be called when TraditionalHouseClass 201 changes any property. Using the two-way street analogy, this is the part of the street (a single lane) going from the object, TraditionalHouseClass 201, to the UI, TraditionalUIforHouseClass 202.

The second half of the street, going from the UI to the object, in FIG. 2 actually has two lanes. The addHousePriceTextPropertyChangedListener( ), method number four, registers TraditionalHouseClass 201 as a listener for when the house price text field changes in the UI. If a user types in a change on the UI, TraditionalHouseClass 201 will be notified after the change occurs. Thus, addHousePriceTextPropertyChangedListener( ) registers one "lane" of the second half of the street. Similarly, the fifth method, addRoomSizeTextPropertyChanged( ) listener, registers TraditionalHouseClass 201 as a listener for when the house price text field changes in the UI. Again, if a user types in a change on the UI, TraditionalHouseClass 201 will be notified after the change occurs. Now the "street" is complete.

A street is of no benefit if there is no "traffic." The rest of the methods on Traditional class sequence diagram 200 register the traffic. The house's price is retrieved from TraditionalHouseClass 201 by method six, getHousePrice( ). The price is set into the UI, and the GUI text box for this is displayed, by the setHousePrice( ) method, method number seven. This method also allows entry by the user of another house price. Similarly, getRoomSize( ) retrieves room sizes from TraditionalHouseClass 201. setRoomSize( ) UI method (method nine) then displays and allows the user to enter a new value for the room size property. Traffic consists of messages from TraditionalUIforHouseClass 202 to TraditionalHouseClass 201 and visa versa.

For instance, if a user enters a larger room size, a message is sent to TraditionalHouseClass 201 that the room size value has changed. The entering of the larger room size is the event and the message is the event notification. Thus, there is traffic on one side of the street. TraditionalHouseClass 201 must appropriately change this value for its private copy of the property. TraditionalHouseClass 201 has a private copy of the property to prevent other objects from changing this value haphazardly. For instance, if a user changes the room size to a gargantuan size, TraditionalHouseClass 201 would like to generate an error to inform the user that the room's size is too big. If other objects were able to overwrite TraditionalHouseClass 201's private copy of room sizes, this error checking may not take place. If the room size is reasonable, but the room size changes significantly, the TraditionalHouseClass 201 may change the house price (larger rooms generally equate with a larger house price). If TraditionalHouseClass 201 changes the house price, a message (an event notification) will be sent to TraditionalUIforHouseClass 202 that the house price has changed. Thus, there is traffic on the second side of the street. In addition, TraditionalUIforHouseClass 202 must update the UI to show the new house price. Generally, this will be done by calling getHousePrice( ) and setHousePrice( ).

FIG. 2 illustrates that the assembler must make many connections between main program 203 and classes, with each line from main program 203 to a class representing a connection that must be made by the assembler. FIG. 2 shows a very simple example, yet there are already nine lines on the assembler's canvas. In addition, the program's structure is already complex because there are so many interconnections between TraditionalHouseClass 201, TraditionalUIforHouseClass 202 and main program 203 that the visual structure of the program is almost unwieldy. This is particularly egregious because most of the method connections serve the same purpose (UI interaction, listeners, and public interface interactions). What the developer would like is an invention that makes this complex structure simpler.

Figure 3:
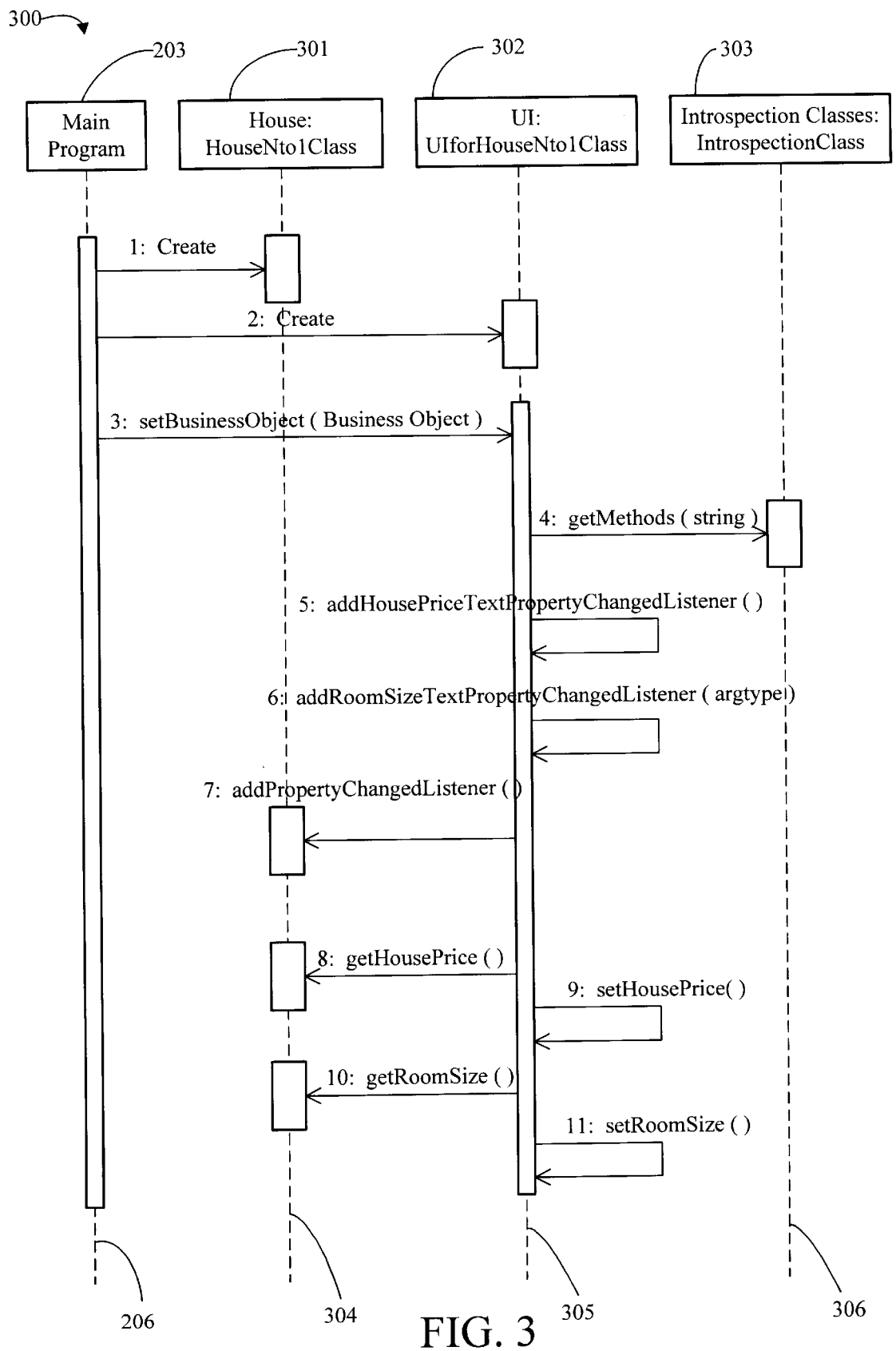
FIG. 3 is a class sequence diagram illustrating the interconnection of and the process of interconnecting classes in accordance with a preferred embodiment of the present invention.

Turning now to FIG. 3, a preferred embodiment for reducing complexity from N to 1 connections is shown. FIG. 3 shows N to 1 class sequence diagram 300 illustrating the interconnection of and the process of interconnecting N to 1 classes. N to 1 class sequence diagram 300 connects HouseNto1Class 301 to the user interface class for this class, UIforNto1HouseClass 302. In addition, IntrospectionClass 303 is interconnected with UIforHouseNto1Class 302. IntrospectionClass 303 consists of introspection classes that can perform introspection on an object to take apart an object's public interface. The same basic methods as in FIG. 2 are performed, yet it is immediately apparent that there are only three lines (indicating method calls) that are connected to main program 203. The visual and real complexity of interconnections, from the assembler's point of view, are dramatically reduced. The reduction in real complexity of interconnections directly transfers to a reduction in the program's complexity, even though no functionality has been lost.

Much of the complexity to which the assembler was exposed in FIG. 2 is now moved into the component and put into the visual construction simplification mechanism 125 (not shown in FIG. 3). The assembler makes only three connections and visual construction simplification mechanism 125 makes five connections, making the assembler's task easier. The three connections made by the assembler are the first three methods on N to 1 class sequence diagram 300: the two Create( ) methods and the setBusinessObject( ) method. The two create methods are the same as in traditional class sequence diagram 200. The number of connections has been reduced from N (in this case, seven) to 1 (the setBusinessObject( ) method). The two Create( ) methods are not counted in the N or the 1 connection because each object must be instantiated. Thus, there must always be some type of Create( ) method, independent of any other connections.

The third method, and the method that is the bootstrap connection that starts visual construction simplification mechanism 125, is setBusinessObject( ). From visual construction s the bootstrap connect is an "existing" connection because this connection must exist before visual construction simplification mechanism 125 may start. From the assembler's point of view, however, the bootstrap connection must be made to start the construction process; as such, the bootstrap connection does not exist until the assembler makes the connection. The setBusinessObject( ) is a method defined in the San Francisco project. Thus, UIforHouseNto1Class 302 could inherit the class from which setBusinessObject( ) is derived or be provided with similar functionality without inheritance. The setBusinessObject( ) method passes a HouseNto1Class 301 reference (as a reference to a business object) to UIforHouseNto1Class 302 so that UIforHouseNto1Class 302 and visual construction mechanism 125 have access to the HouseNto1Class 301's interface. Without this reference, the following steps would not be possible (the introspection process must have a component on which introspection is performed). What is important is that the setBusinessObject( ) is the bootstrap connection (or existing connection, depending on whether the point of view is that of the assembler or visual construction simplification mechanism 125) that starts visual construction simplification mechanism 125.

Returning to FIG.3, all other methods shown in N to 1 class sequence diagram 300 have the same basic functions as those in traditional class sequence diagram 200 with the following differences. The origination of the method call has moved from the component assembler to the components themselves. All methods being called from the components are actually called dynamically as opposed to statically. Dynamic calls, as stated in the Overview section, are made at runtime, whereas static calls are configured at compilation. As such, dynamic calls allow calling methods of classes without knowing what particular class is being called. This allows the designer to leave the particular class call "open" until the program is actually run, instead of requiring the designer at compile time to choose which particular method and class will be called. This is similar to the polymorphism concept embodied in Java and C++, wherein children of a parent class can be called at runtime. When the dynamic call is made, the program only knows of the methods that exist on the target class.

These dynamic method calls are actually made by calling the callMethod( ) method (not shown in FIG. 3) of IntrospectionClass 303. The callMethod( ) method is a way to dynamically invoke another method, otherwise known as late binding. Thus, visual construction simplification mechanism 125 properly sets and configures all method calls and interactions to interconnect HouseNto1Class 301, UIforHouseNto1Class 302, and main program 203 through dynamic invocation of the appropriate methods. The callMethod( ) method actually used can be any method that can perform dynamic invocation or late binding.

In addition, the registration processes (and the associated "streets") are slightly changed. UIforHouseNto1Class 302 still registers HouseNto1Class 301 as a listener for changes in the house price text by using addHousePriceTextPropertyChangedListener( ), but visual construction simplification mechanism 12Listener( ) for this registration. The assembler need not make the connection for this registration. It is important to realize that even though this registration is not a "direct" connection between the two objects being connected (e.g., there method call is from and to UIforHouseNto I Class 302 and not from UIforHouseNto1Class 302 to HouseNto1Class 301), the addHousePriceTextPropertyChangedListener( ) connection is still a connection that must made to properly interconnect the two objects. Without the proper registration of listeners, events will not be routed properly. In the preferred embodiment of the invention, many events and event notifications (and the corresponding listener registrations) may be set up with one method call. Proper event and notification routing must still be performed even though there is only one method call registering the many events (and their routing). Thus, the term "connection" or the verb "connect" encompasses any and all method calls wherein one object is linked in any way with another object. Registration and event routing are "indirect" links between two objects, but they are encompassed by the term "connection" or the verb "connect" nonetheless.

Similarly, another indirect link is made when UIforHouseNto1Class 302 also registers HouseNto1Class 301 as a listener for changes in the room size by using addRoomSizeTextPropertyChangedListener( ). This registration is done by dynamically calling addRoomSizeTextPropertyChangedListener( ). Visual construction simplification mechanism 125 adds this functionality into UIforHouseNto1Class 302.

getMethods( ), method number four in N to 1 class sequence diagram 300, is part of IntrospectionClass 303. Introspection, as stated previously, is a generic term for the ability of a component to examine or inspect the details of another component. Introspection is a discovery process in which each component "looks back" to the component to which it is connected will return a list of the methods on the business object (instantiated from HouseNto1Class 301). For instance, the methods returned by getMethods( ) in FIG. 3 would be addPropertyChangedListener( ), getHousePrice( ) and getRoomSize( ). By using this list of methods, visual construction simplification mechanism 125 can recognize that the business object is a certain identity that will allow it to hook up UIforHouseNto1Class 302 to the business object based on a known set of methods. In FIG. 3, the identity of the component is HouseNto1Class 301. Visual construction simplification mechanism 125 would recognize that these methods are available and would automatically call them.

Introspection is supported by many object-oriented languages. For instance, the Java package sun.tools.debug contains several classes used for object introspection. This package has getmethod( ), getmethods( ), and getMethodNames( ) methods that return a method using a specific method name, all of the class's methods in an array, and an array of strings (actually an array of string objects) containing the names of a class's methods, respectively. As used in a preferred embodiment of this invention, introspection refers to using one or more method calls from an introspection class to determine the identity of an object. Any manner of dissecting an object's public interface and returning its methods is appropriate to support introspection for this invention. What is important is that there is some manner or method of discovering the identity of an object and allowing visual construction simplification mechanism 125 to connect this first component to another component based on the identity of the first component. In a preferred embodiment of this invention, the identity of the component is discovered by using one or more method calls to introspection methods that return a method or all methods of the first object; from these methods, the proper connections to connect this first object to a second object are then retrieved and set up.

Figure 6:
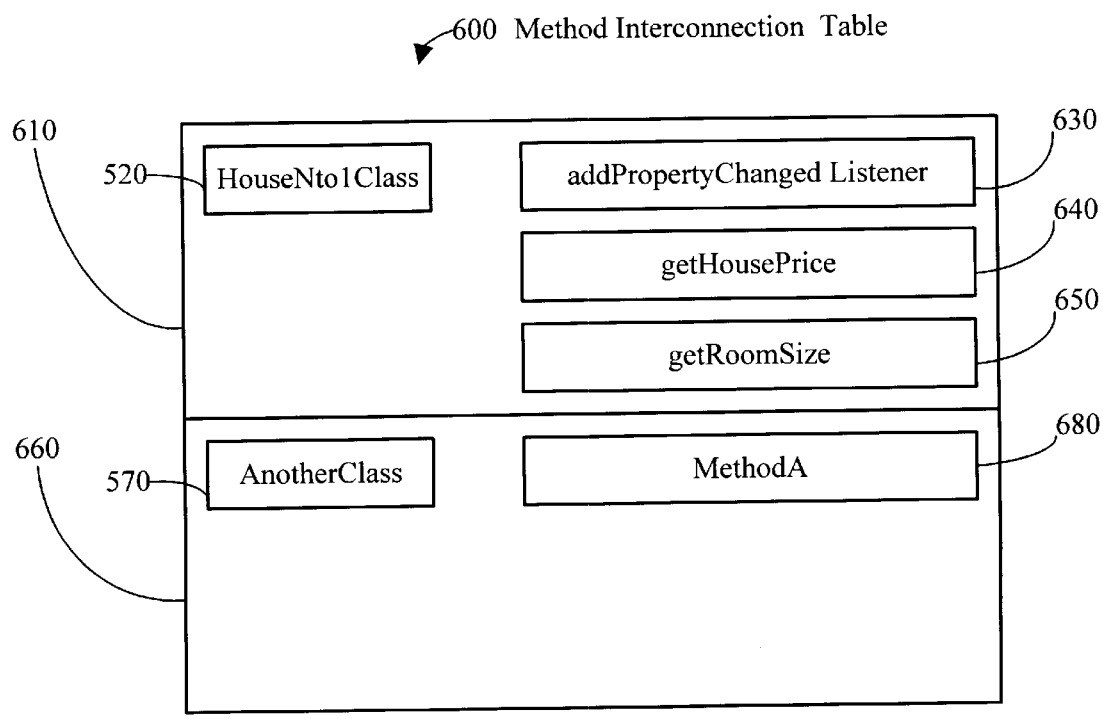
FIG. 6 diagrams a method interconnection table in accordance with a preferred embodiment of the present invention.

The preferred manner in which visual construction simplification mechanism 125 knows the identity of an object and which methods need to be dynamically called (to properly connect the two objects) is through the use of tables that are preferably stored separately from visual construction mechanism 125. Visual construction simplification mechanism 125 will preferably access a table that equates a particular identity to the methods need to be called and connected for that identity. This will be called method interconnection table 600 and is shown in FIG. 6. In addition, there will preferably be a second table that equates a list of methods to a particular identity. This will be called idenG. 5.

There are two ways to tell what identity a component is. The first is by using a class of a component to determine an identity. For instance, if introspection reveals that Class A is implemented in a component, then the identity is Class A. This is irrespective of how many actual classes are implemented. For instance, if Component A implements Class A, Class B, and Class C, then Component A's identity will be at least Class A (and also could be Class B and Class C, if Component A also implements these classes). The preferred embodiment of the present invention, however, uses the second way to determine the identity of a component—by using methods. Every component will have at least one identity because every component will have at least one public method and/or be derived from at least one class. Component A will have certain methods and Component B will have different methods, and the identity of the different components will be based on the methods retrieved through introspection. Note that inheritance will affect these determinations. For instance, if Component A is a Fish and Component B is a Dog, both of which inherit from the Animal class, then both Component A and Component B will have at least the identity of an Animal.

Each identity will have a list of methods that will allow the visual construction simplification mechanism 125 to "match up" the returned methods with an identity. There will generally be several identities, each with its own particular list of methods. After introspection has been performed and the number and types of methods for a component are returned, visual construction simplification mechanism 125 can parse through an identity table. Visual construction simplification mechanism 125 will compare the returned methods with each of the lists of methods in the identity table. Once a "match" is found, e.g. the returned methods are the same as the methods in one of the lists of methods, then visual construction of the component because the identity of the component is linked to its individual list. This link can be any known manner of linking two data pieces together, e.g. the identity could be stored with the list or the identity could be stored separately from the list but a reference to the identity stored with the list. If no "match" is found, visual construction simplification mechanism 125 will not know the identity of the component and will not connect the component. Manual interconnection of the two components must be performed.

Figure 5:
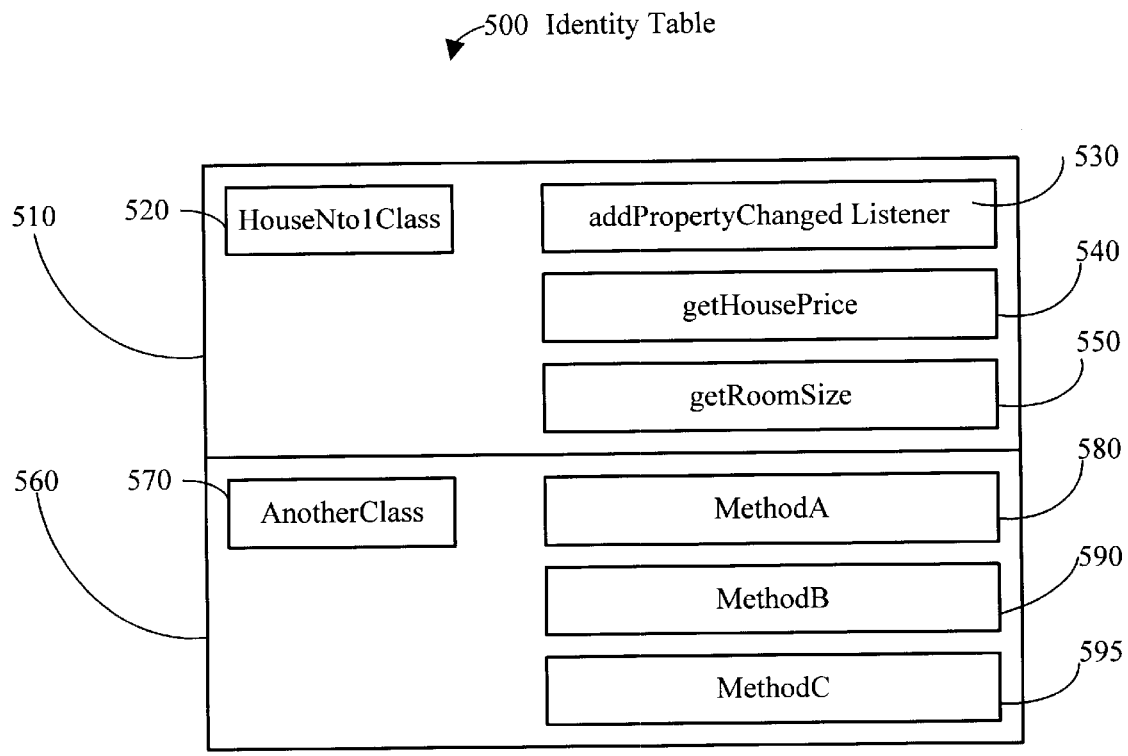
FIG. 5 diagrams an identity table in accordance with a preferred embodiment of the present invention.

A small identity table is shown in FIG. 5. Identity table 500 has HouseNto1Class entry 510, which corresponds to HouseNto1Class 301 and its methods, and AnotherClass entry 560, which corresponds to AnotherClass and its methods. HouseNto1Class entry 510 has HouseNto1Class identity 520, addPropertyChangedListener method 530, getHousePrice method 540, and getRoomSize method 550. AnotherClass entry 560 has AnotherClass identity 570, MethodA method 580, MethodB method 590, and MethodC method 595. If the introspection process returns methods addPropertyChangedListener method 530, getHousePrice method 540, and getRoomSize method 550, when visual construction simplification mechanism 125 parses identity table 500, visual construction simplification mechanism 125 will determine that the identity of the component with those methods is HouseNto1Class identity 520. Similarly, if the introspection process returns methods MethodA method 580, MethodB method 590, and MethodC method 595, then visual construction simplification mechanism 125 will parse identity table 500 and determine that the component with these methods has AnotherClass identity 570.

Once the identity is known, visual construction simplification mechanism 125 will use this identity to parse through a method interconnection table. The identity provides a link from the identity to the methods that need to be connected. It must be understood that these connections are actually dynamic method calls. The dynamic method calls, nonetheless, connect one component to another because one component will be communicating with another component through the method call. In addition, all other necessary information that will enable visual construction simplification mechanism 125 to make the proper method call will be in the method interconnection table. Such information will generally consist of the types and quantities of data that will be passed to or received from the method.

A small method interconnection table is shown in FIG. 6. Method interconnection table 600 has HouseNto1Class entry 610 and AnotherClass entry 660. HouseNto1Class entry 610 contains HouseNto1Class identity 520, addPropertyChangedListener method 630, getHousePrice method 640, and getRoomSize method 650. AnotherClass entry 660 contains AnotherClass identity 570 and MethodA method 680. Note that the AnotherClass component only needs one method call, MethodA method 680, to properly interconnect with the other component to which visual construction simplification mechanism 125 is attempting to connect the AnotherClass component. In addition, method interconnection table 600 also generally contains all other necessary information that will enable visual construction simplification mechanism 125 to make the proper method call. This information is not shown in FIG. 6, but the information consists of parameter lists and other data necessary to make a method call.

Those skilled in the art will realize that there may need to be several of these identity tables and method interconnection tables. For instance, if visual construction simplification mechanism 125 attempts to connect Component A to Component B, where introspection is being performed on Component B, then the identity table and method interconnection table are used from Component A's point of view. In other words, visual construction simplification mechanism 125 knows that it is hooking up Component A to some other component. When visual construction simplification mechanism Component C with Component B, where introspection is again being performed on Component B, now the identity table and method interconnection table are being used from Component C's point of view. For instance, referring to FIG. 6, Component C's method interconnection table 600 may have different methods in AnotherClass entry 660 because Component C may need more than, or a different method than, MethodA metho 680. Referring to FIG. 5, Component C's identity table 500 may also be different because Component C may not be able to be connected to HouseNto1Class 301. As such, there would then be a different entry in HouseNto1Class entry 520.

Those skilled in the art will also realize that the method interconnection and identity tables may be combined into one table. For instance, it is somewhat superfluous to use the returned methods to find the identity and use the identity to get the needed dynamic method calls, when one could skip the step of finding the identity and use the returned methods to directly get the needed dynamic method calls. However, an identity is still being "found" (though not "used") because the returned methods must equate with some identity. Those skilled in the art will also realize that there are many different ways of linking a set of returned methods to an identity and the identity to a set of needed dynamic calls and connections. This can include tables, database structures, linked lists, arrays or objects containing any of these. What is important is that the at least one identity of the component be introspected is used to find the needed connections. In addition, those skilled in the art will realize that certain properties of objects and components will affect these tables. In particular, the property of inheritance will affect the implementation of tables. This is discussed in more detail below.

Finally, it is possible for the assembler to be notified once visual construction simplification mechanism 125 has completed its connections. For instance, visual construction simplification mechanism 125 could send system level messages or perform other functions such that an assembler would be aware of the completion of connections. In addition, visual construction simplification mechanism 125 could return a list of completed connections.

If getMethods returns a list a methods with which UIforHouseNto1Class 302 is unfamiliar, UIforHouseNto1Class 302 will then operate as in the prior art visual development system. The assembler will then have to laboriously and correctly connect all needed connections so that UIforHouseNto1Class 302 and HouseNto1Class 301 will correctly interoperate. Thus, visual construction simplification mechanism 125 is added to the regular functionality (methods, properties, and events) of UIforHouseNto1Class 302; and in no way impedes UIforHouseNto1Class 302 when UIforHouseNto1Class 302 interacts with prior art systems.

Thus, the onus is on visual construction simplification mechanism 125 to properly interconnect UIforHouseNto1Class 302 and HouseNto1Class 301, and on the component designer to add the functionality into the component for visual construction simplification mechanism 125 to properly connect the two components. Visual construction simplification mechanism 125 uses introspection to find out what another object is (i.e., the object's identity) and can then use this information to properly interconnect components; this will dramatically reduce visual and actual complexity of a program.

While the previous discussion has considered the simple example of an object instantiated from simple classes, it should be understood that the preferred embodiment of the present invention generally involves components having much greater complexity. Such components could be made of a multitude of classes and methods and data for those classes. In addition, a first component that has been connected by visual construction simplification mechanism 125 to another component may also be manually connected to components that visual construction mechanism 125 is not able to identify and connect to the first component. Also, this first component may be connected to any number of other components by visual construction simplification mechanism 125, as long as visual construction simplification mechanism 125 can identify the other component.

Figure 4:
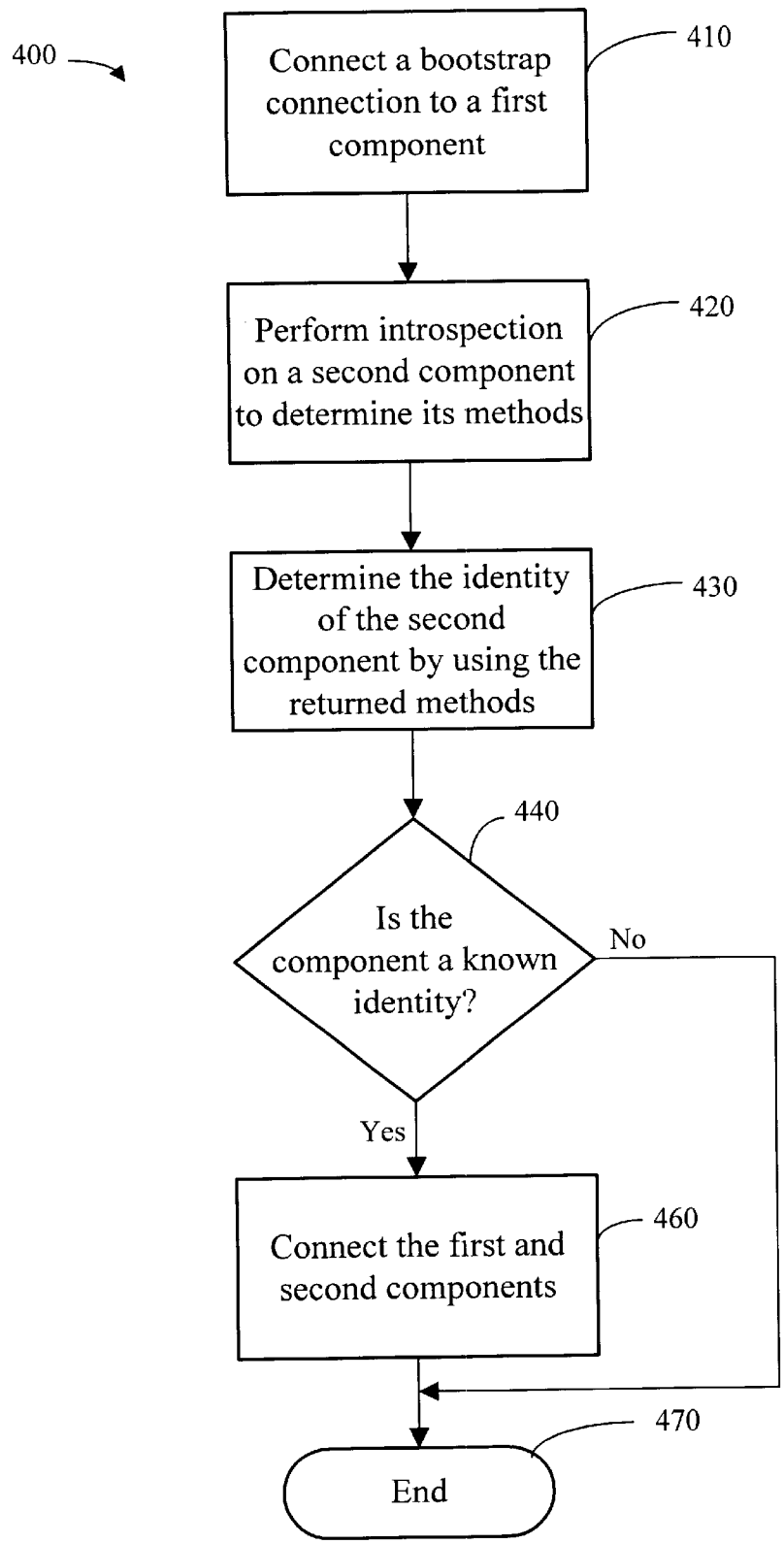
FIG. 4 shows a method for reducing connections from N to 1 in accordance with a preferred embodiment of the present invention.

Turning now to FIG. 4, method 400 for reducing connections from N to 1 is shown. Method 400 begins when two components are connected. In step 410, a bootstrap connection is made to a first component. This first connection is the bootstrap connection that starts the entire N to 1 reduction process, as explained with reference to FIG. 3. The bootstrap connection in FIG. 3 is the setBusinessObject( ) connection from main program 203 to UIforHouseNto1Class 302. It is important that the bootstrap connection provide some manner of passing a second component to the first component. This can be any manner of passing a second component to a first component known to those skilled in the art, but generally, a reference to the second component will be passed to the first component. Note that what is important is that the introspection process must have a component on which the introspection process can perform introspection. Method 400 is shown from the first component's perspective (i.e.—visual construction simplification mechanism 125 will perform introspection on the second component).

Once the initial bootstrap connection is made, visual construction simplification mechanism 125 performs introspection on the second component to determine the second component's methods (step 420). The introspection process examines the second component's public interface and returns a list of methods that are contained in the second object. These methods are then compared to the various lists of methods that the builder of the first component has programmed into visual construction simplification mechanism 125. See the discussion above concerning the preferred methods of performing this min step 430 the identity of the second component is determined. Generally, there will be several identities of components for which visual construction simplification mechanism 125 can configure the interconnections without any "help" from the assembler. Each identity will have its own list of methods. For instance, if there are two identities, Identity A and Identity B, then Identity A might have Method A1 and Method A2 on its public interface. Identity B might have Method B1 and Method B2 on its public interface. Visual construction simplification mechanism 125 will know that the second component is Identity B if introspection returns Method B1 and Method B2. If introspection returns Method A1 and Method A2, visual construction simplification mechanism 125 will know that the second component is Identity A.

Using the particular example in FIG. 3, if the introspection process returns the methods addPropertyChangedListener( ), getHousePrice( ) and getRoomSize( ), then visual construction simplification mechanism 125 will know that this component (or object) has the identity "HouseNto1Class 301". Once the identity is known, then visual construction simplification mechanism 125 can connect the appropriate method calls, as discussed in connection with FIG. 3, in order for HouseNto1Class 301 to be properly connected with UIforHouseNto1Class 302. Note, again, that the appropriate method calls will be performed though dynamic or late binding, and any manner of connecting two components is encompassed by the term "connection" or the verb "connect." For instance, "direct" connections such as direct method call getHousePrice( ) shown in FIG. 3 is one such connection. This is a "direct" method call because UIforHouseNto1Class 301 directly calls the getHousePrice( ) method on HouseNto1Class 301. Also, indirect connections such as addHousePriceTextPropertyChangedListener( ), which registers HouseNto1Class 301 as a listener for certain events, is also a co actual connection (addHousePriceTextPropertyChangedListener( )) that registers HouseNto1Class 301 as a listener is called from UIforHouseNto1Class 302 and to UIforHouseNto1Class 302. But this connection is necessary for proper connection of the two components because event notification and listeners are essential to the proper operation of the two components.

Visual construction simplification mechanism 125 connects the two components in step 460. The step of connecting the two components, as stated above, requires performing all necessary method and event connections in order for the two components to interact correctly. Again, as stated previously, this entails making any and all, direct or indirect, connections that are necessary to properly connect the two components. In the example of FIG. 3, the UIforHouseNto1Class 302 will connect the appropriate methods as outlined above in reference to this figure. In addition, it must be understood that the method will generally be called dynamically. As such, the calls and the appropriate set up for these calls (such as any arrays or reference or pointer set up and initializations, method calls to register the method—in general, whatever the particular programming language requires for such dynamic method calls) must be performed.

Furthermore, some manner of using the identity of the component to retrieve the method calls and connections needed to interconnect the two components in step 460 should be used. The preferred manner for doing this is by using the method interconnection table as described previously. However, any manner wherein the identity of the component is used to retrieve the necessary method calls and make the proper connections is suitable for step 460. What is important is that visual construction simplification mechanism 125 is able to ascertain the correct methods and connections that are needed to interconnect the two components, and that visual construction mechanism 125 is able to actually call the me the two components.

When the appropriate method calls are connected by visual construction simplification mechanism 125, the N to 1 connections have been completed. The component assembler makes one connection while visual construction simplification mechanism 125 makes N connections. Step 470, an end step, has been reached.

After assembly, an end may also be reached if the second component's identity is unknown. If, in step 420, the introspection performed on the second component reveals methods that do not belong to a known identity (as determined in step 430), the end step 470 will be reached. Note that the identity of the component may not be known for several reasons. This will be illustrated by referring back to the example where there are two identities, Identity A and Identity B. Identity A has Method A1 and Method A2; Identity B has Method B1 and Method B2. If introspection in step 420 could find no methods that are connected to Identity A or Identity B, then method 400 would end at step 470 because an unknown identity was found. For instance, if introspection returned Method C1 and Method C2, the first component is not designed to configure method calls for these methods and method 400 ends. Similarly, if introspection returned Method A1 but not Method A2, method 400 will also end at step 470 because an unknown identity was found. Visual construction simplification mechanism 125 can notify the assembler of the "no match" error and component assembly can then proceed by hand.

It must be understood that inheritance may affect the identification process. For instance, if Identity C inherits from Identity A, then introspection will return at least Method A1 and Method A2 (in addition to whatever methods Identity C has added as a subclass) and step 470 will generally NOT be reached. Instead, step 460 will generally be performed. However, visual construction simplification mechanism 125 has a choice as to which steps will be performed. In the previous example wherein tables were used to link the returned methods to the identity of the component and then to the needed dynamic calls or connections, visual construction simplification mechanism 125 has a choice as to whether or not this component's identity is known. If introspection returns Method Al, Method A2 and Method C1, and the identity table has Identity A linked with the list containing Method A1 and Method A2 (but not containing Method C1), then visual construction simplification mechanism 125 has a choice to make as to whether this is Identity A.

Generally, the designer of the identity table and the method interconnection table will list whether inheritance means that a particular identity's methods (as contained in the method interconnection table for the identity) will or will not be connected. The designer can build choice and any result of the choice into the table and/or into visual construction simplification mechanism 125. Those skilled in the art will realize the many different ways in which inheritance may be ascertained (such as programming statements that give the "is a" relationship or by using the methods already returned by introspection).

As demonstrated through the examples presented above, the method and apparatus of the present invention can significantly reduce the actual and visual complexity of component interconnections and programs therewith.

While the present invention has been particularly shown and described with reference to preferred embodiments thereof, it will be understood by those skilled in the art that various changes in form and details may be made therein without departing from the spirit and scope of the invention.

What is claimed is:

1. An apparatus comprising:
    at least one processor;
    a memory coupled to the at least one processor;
    a plurality of components residing in the memory; and
    a visual construction simplification mechanism, the visual construction simplification mechanism taking an initial connection a between a first component and a second component of a plurality of components that has been defined by a programmer, and based upon the initial connection, performing an introspection method call on the first component, the introspection method call determining additional connections between the first component and the second component, the visual construction simplification mechanism then establishing the determined additional connections between the first component and the second component.

2. The apparatus of claim 1 wherein the visual construction simplification mechanism uses the determined additional connections to determine an at least one identity of the first component.

3. The apparatus of claim 2 wherein the first component further comprises a plurality of methods and wherein introspection further comprises performing a plurality of method calls that return the plurality of methods to the visual construction simplification mechanism.

4. The apparatus of claim 2 wherein the apparatus further comprises a method interconnection table residing in the memory, wherein the at least one additional connection comprises a method call, and wherein the visual construction simplification mechanism uses the at least one identity of the first component to parse through the method interconnection table to retrieve each method call that the visual construction simplification mechanism uses to make the determined additional connection.

5. The apparatus of claim 3 wherein the apparatus further comprises an identity table residing in the memory and wherein the visual construction mechanism uses the returned plurality of methods to parse through the identity table and to determine the at least one identity of the first component.

6. The apparatus of claim 5 wherein the identity table further comprises a plurality of lists of methods, each list of methods being linked to an identity, and wherein the visual construction simplification method compares the returned plurality of methods to each list of methods to determine the at least one identity of the first component.

7. The apparatus of claim 1 wherein each of the plurality of components comprises at least one identity and wherein the visual construction simplification mechanism determines the at least one identity of one of the plurality of components.

8. The apparatus of claim 1 wherein the at least one additional connection comprises a method call.

9. The apparatus of claim 8 wherein each method call is performed dynamically.

10. An apparatus comprising:
    at least one processor;
    a memory coupled to the at least one processor;
    a plurality of components residing in the memory, each component comprising at least one identity, the plurality of components comprising at least first and second components, wherein the first and second components have an initial connection between them; and
    a visual construction simplification mechanism residing in the memory, the visual construction simplification mechanism taking an initial connection a between the first component and the second component and performing an introspection method call on the first component to dynamically determining the first component's at least one identity and making at least one additional connection based on that at least one identity to connect the first component to the second component.

11. The apparatus of claim 10 wherein the at least one component further comprises a plurality of methods and wherein introspection further comprises performing a plurality of method calls that return the plurality of methods to the visual construction simplification mechanism.

12. The apparatus of claim 11 wherein the apparatus further comprises an identity table residing in the memory and wherein the visual construction mechanism uses the returned plurality of methods to parse through the identity table and to determine the at least one identity of the first component.

13. The apparatus of claim 11 wherein the identity table further comprises a plurality of lists of methods, each list of methods being linked to an identity, and wherein the visual construction simplification method compares the returned plurality of methods to each list of methods to determine the at least one identity of the first component.

14. The apparatus of claim 10 wherein the apparatus further comprises a method interconnection table residing in the memory, wherein each connection of the at least one additional connection comprises a method call, and wherein the visual construction simplification mechanism uses the at least one identity of the first component to parse through the method interconnection table to retrieve each method call that the visual construction simplification method uses to make each connection of the at least one additional connection.

15. The apparatus of claim 10 wherein each connection of the at least one additional connection comprises a method call.

16. The apparatus of claim 15 wherein each method call is performed dynamically.

17. An object-oriented apparatus comprising:
at least one processor;
a memory coupled to the at least one processor;
a method interconnection table residing in the memory;
an identity table residing in the memory;
a plurality of components residing in the memory, each component comprising at least one identity and a plurality of methods, the plurality of components comprising at least first and second components, wherein the first and second components have an existing connection between them; and
a visual construction simplification mechanism residing in the memory, the visual construction simplification mechanism using an introspection method call on the first component to determine the plurality of methods associated with the first component, the visual construction simplification mechanism using the plurality of methods to parse the identity table to determine the first component's at least one identity and using the plurality of methods to parse the method interconnection table to determine a plurality of additional connections, the visual construction simplification mechanism making the plurality of additional connections between the first and second component.

18. The apparatus of claim 17 wherein the identity table further comprises a plurality of lists of methods, each list of methods being linked to an identity, and wherein the visual construction simplification method compares the returned plurality of methods to each list of methods to determine the at least one identity of the first component.

19. The apparatus of claim 17 wherein each of the plurality of connections comprises a method call.

20. The apparatus of claim 19 wherein each of the method calls is performed dynamically.

21. A method for automating connections in a programming environment on a computer system, the programming environment having a plurality of components, the plurality of components comprising at least first and second components, the method comprising the steps of:
connecting an initial connection to the first component;
determining at least one identity of the second component by performing an introspection method call on the second component; and
making at least one additional connection based on the at least one identity to connect the first component to the second component.

22. The method of claim 21 wherein the step of connecting an initial connection further includes the step of passing a reference to the first component, the reference referencing the second component.

23. The method of claim 21 wherein each connection of the at least one additional connection comprises a method call and wherein the method further comprises the step of using the identity of the second component to parse through a method interconnection table to retrieve each method call that is used to make each connection of the at least one additional connection.

24. The method of claim 21 wherein the second component further comprises a plurality of methods and wherein introspection further comprises performing a plurality of method calls that return the plurality of methods.

25. The method of claim 24 further comprising the step of using the returned plurality of methods to parse through the identity table and to determine the identity of the second component.

26. The method of claim 21 wherein each connection of the at least one additional connection comprises a method call.

27. The method of claim 26 wherein each method call is performed dynamically.

28. A method for automating connections in a programming environment on a computer system, the programming environment having a plurality of components, the plurality of components comprising at least first and second components, the method comprising the steps of:
connecting an initial connection to the first component, wherein a reference to the second component is passed to the first component, and wherein the second component comprises a plurality of methods;
determining at least one identity of the second component by performing introspection method calls on the second component, wherein introspection method calls return the plurality of methods of the second component; and
making at least one additional connection to the plurality of methods of the second component based on the at least one identity to connect the first component to the second component.

29. The method of claim 28 wherein each connection of the at least one additional connection comprises a method call and wherein the method further comprises the step of using the at least one identity of the second component to parse through a method interconnection table to retrieve each method call that is used to make each connection of the at least one additional connection.

30. The method of claim 26 further comprising the step of using the returned plurality of methods to parse through the identity table and to determine the at least one identity of the second component.

31. The method of claim 28 wherein each connection of the at least one additional connection comprises a method call.

32. The method of claim 31 wherein each method call is performed dynamically.

33. A program product comprising:
a visual construction simplification mechanism dynamically performing an introspection method call on the first component to determine any connections between a first component and a second component based on an initial connection between the first component and the second component, and wherein the first component further comprises a plurality of methods and wherein introspection further comprises performing a plurality of method calls that return the plurality of methods to the visual construction simplification mechanism, the visual construction simplification mechanism dynamically determining at least one identity of a first component, and wherein the visual construction simplification mechanism uses this at least one identity to make at least one determined connection between the first component and a second component; and signal bearing media bearing the visual construction simplification mechanism.

34. The program product of claim 33 wherein the signal bearing media comprises transmission media.

35. The program product of claim 33 wherein the signal bearing media comprises recordable media.

36. The program product of claim 33 wherein the existing connection passes a reference to the second component, the reference referencing the first component.

37. The program product of claim 33 wherein each connection of the at least one additional connection comprises a method call and wherein the visual construction simplification mechanism parses through a method interconnection table to retrieve each method call that is used to make each connection of the at least one additional connection.

38. The program product of claim 33 wherein the visual construction simplification mechanism performs introspection on the second component to determine the first component's at least one identity.

39. The program product of claim 33 wherein the visual construction simplification mechanism is further capable of using the returned plurality of methods to parse through an identity table to determine the at least one identity of the first component.

40. The program product of claim 33 wherein each connection of the at least one additional connection comprises a method call.

41. The program product of claim 40 wherein each method call is performed dynamically.

42. A program product comprising:

a visual construction simplification mechanism, the visual construction simplification mechanism taking an initial connection a between a first component and a second component of a plurality of components that has been defined by a programmer, and based upon the initial connection, performing an introspection method call on the first component, the introspection method call determining additional connections between the first component and the second component, the visual construction simplification mechanism then establishing the determined additional connections between the first component and the second component; and signal bearing media bearing the visual construction simplification mechanism.

43. The program product of claim 42 wherein the signal bearing media comprises transmission media.

44. The program product of claim 42 wherein the signal bearing media comprises recordable media.

45. The program product of claim 42 wherein the visual construction simplification mechanism uses the determined additional connections to determine an at least one identity of the first component.

46. The program product of claim 45 wherein the visual construction simplification mechanism determines an identity of the first component.

47. The program product of claim 45 wherein the first component further comprises a plurality of methods and wherein introspection further comprises performing a plurality of method calls that return the plurality of methods to the visual construction simplification mechanism.

48. The program product of claim 47 wherein the visual construction simplification mechanism is further capable of using the returned plurality of methods to parse through an identity table to determine the at least one identity of the first component.

49. The program product of claim 42 wherein the initial connection passes a reference to the second component, the reference referencing the first component.

50. The program product of claim 42 wherein each connection of the at least one additional connection comprises a method call and wherein the visual construction simplification mechanism parses through a method interconnection table to retrieve each method call that is used to make the at least one additional connection.

51. The program product of claim 42 wherein each connection of the at least one additional connection comprises a method call.

52. The program product of claim 51 wherein each method call is performed dynamically.

* * * * *